3,417,141
PROCESS FOR SEPARATING MONOAMINES FROM DIAMINES BY LIQUID-LIQUID EXTRACTION
Julian Feldman and Jay K. Seyler, Cincinnati, Ohio, assignors to National Distillers and Chemical Corporation, New York, N.Y., a corporation of Virginia
No Drawing. Filed June 25, 1965, Ser. No. 467,113
17 Claims. (Cl. 260—563)

ABSTRACT OF THE DISCLOSURE

A process for the separation of monoamines from diamines having at least six carbon atoms per molecule by liquid-liquid extraction. A mixture of the monoamines and diamines is contacted with a polar solvent, e.g., a lower alkanol, and a non-polar solvent, e.g., a hydrocarbon having from 4 to 18 carbon atoms per molecule, and an extract phase containing the monoamines and the non-polar solvent is recovered.

---

This invention relates to a method for the separation of diamine mixtures and more particularly to a method for resolving mixtures of monoamines and diamines having from 6 to 16 carbon atoms per molecule.

A number of synthetic processes yield product mixtures containing monoamines and diamines having the same number of carbon atoms. It is generally possible to separate low molecular weight monoamines from diamines by distillation. However, higher molecular weight monoamines and diamines of similar volatility, and particularly those amines having six or more carbon atoms are considerably more difficult to separate by distillation techniques. Conventional distillation processes are usually ineffective, and the use of special columns involving long periods of elevated temperature lead to decomposition and undesirable by-product formation.

A number of synthetic processes yield mixtures of monoamines and diamines having six or more carbon atoms. For example, in United States Patents No. 2,991,312, No. 3,017,435, No. 3,062,886, No. 3,062,888, No. 3,156,729 and copending U.S. patent application S.N. 701,341, filed Dec. 9, 1957, now abandoned, there are described processes for preparing the diamino dimers of olefins and diolefins by means of amino radicals generated by the reaction of a reducing metal cation with a hydroxylamine or a N-halo amine. Diamines of six or more carbon atoms produced by these processes include diaminooctadiene, octamethylenediamine, N,N'-dimethyldiaminooctadiene, dimethyldiaminooctadiene, diaminodecadiene, decamethylenediamine, tetramethylbutanediamine, N,N,N',N' - tetramethyldiaminooctane, diaminobicyclopentyl, diaminobicyclohexyl, dimethyldiaminobicyclohexyl, and others. Accompanying formation of the diamines there is formation in varying amounts of the corresponding monoamines, e.g., aminooctadienyl, octylamine, N,N'-dimethyldiaminooctadienyl, dimethyldiaminooctadienyl, aminodecadienyl, decylamine, tetramethylbutylamine, N,N,N',N'-tetramethyloctylamine, aminobicyclopentyl, dimethylaminobicyclohexyl, etc. Separation of such monoamines from the accompanying diamines has previously been attempted by fractional distillation at elevated temperatures under high vacuum. Using this technique, there is a considerable loss in the yield of desired products due to the tendency of the amine compounds to decompose, generally by oxidation, from the prolonged heating required and the difficulty of excluding air. As is well known, the presence of the monoamines in admixture with the diamines is particularly undesirable where the diamines are to be employed in the formation of polyamides.

One object of this invention is to provide a method for separating monoamines from diamines and mixtures thereof.

Another object of this invention is to provide a practical commercial method for separating, recovering and/or purifying aliphatic, alicyclic or aromatic monoamines and diamines of six or more carbon atoms from mixtures thereof.

A further object of this invention is to provide a method for removing impurities from diamines having six or more carbon atoms.

A still further object of this invention is to provide a method for the separation, recovery and/or purification of diamines from monoamines by liquid-liquid extraction using certain selective solvents.

These and other objects of the present invention will become readily apparent from the ensuing description and illustrative embodiments.

In accordance with this invention, it has now been discovered that monoamines and diamines can be separated and recovered from mixtures thereof by a liquid-liquid extraction process utilizing immiscible liquid amine solvents of differing polarities. In a preferred embodiment of the present invention, the mixture of monoamines and diamines is first contacted and dissolved in a selected aqueous or non-aqueous, relatively polar liquid. This solution is then extracted with a liquid which is (1) less polar relative to the previous solvent, (2) immiscible with the relatively polar solvent, and (3) a solvent for the monoamines. The extract contains substantially all of the monoamines which were present in the starting mixture, whereas the raffinate contains substantially all of the diamines, free from the monoamines. If desired, the raffinate may be further extracted with an even more highly polar immiscible liquid to remove the diamines from the original solvent. Prior to this extraction of the raffinate, it is usually preferable to increase the water content of the raffinate either directly by the addition of water or indirectly by volatilization of all or a portion of the non-aqueous solvent component of the raffinate.

The diamine may be freed from the polar solvent by distillation and from any residual water by washing with an appropriate solvent or solvent pair, e.g., benzene and isopropanol.

In another embodiment of the present invention, the mixture of monoamines and diamines is first contacted and dissolved in a relatively non-polar liquid. This solution is then extracted with a liquid which is (1) more polar relative to the solvent of the above noted solution, (2) immiscible with the relatively non-polar liquid, and (3) a solvent for the diamines. The extract contains substantially all of the diamines which were present in the starting mixture whereas the raffinate contains substantially all of the monoamines. The diamines may be further extracted and freed from the relatively polar solvent in the manner described above with respect to the preferred embodiment.

The relatively polar liquid of the liquid-liquid combination must be immiscible with the relatively non-polar liquid of the combination and must be a solvent for the diamines. Preferably, the relatively polar liquid is strongly polar, that is, exhibits a high dielectric constant, i.e. at least about 15. Suitable polar liquids include water; lower molecular weight alcohols of the methanol series, having from 1 to 4 carbon atoms, e.g., methanol, ethanol, propanol; ethylene glycol; the mono- and diethers and acetates of ethylene glycol; dioxane; formamide; acetonitrile; nitromethane; etc., and mixtures of such compounds. Aqueous solutions of one or more of the polar compound are especially preferred, and the amount of water may range from about 20 to 80% by volume. It will be understood, however, that water need not be employed.

The relatively non-polar liquid of the liquid-liquid combination must be immiscible with the relatively polar liquid and must be a solvent for the monoamines. Preferably, the relatively non-polar liquid is strongly non-polar, that is, exhibits a low dielectric constant. Suitable non-polar liquids include normally liquid aliphatic and aromatic hydrocarbons having from 4 to 18 carbon atoms such as pentane, hexane, heptane, octane, cyclehexane, benzene, toluene; chlorinated hydrocarbons such as carbon tetrachloride, chloroform, ethylene dichloride, trichloroethylene; ethers, such as diethyl ether, diisopropyl ether; and others. Normally liquid hydrocarbons having from 6 to 12 carbon atoms per molecule are preferred as the non-polar liquid.

In general, the volume ratio of polar to non-polar solvent will range from about 1:50 to 50:1, and preferably within the range of about 1:5 to 10:1.

The extraction can be performed concurrently, countercurrently or multistage using conventional equipment such as batch mixing vessels and settling tanks, packed or tray columns, or columns having multistage mixing and settling zones. The operation may be carried out in a continuous or batchwise manner.

The process of this invention is particularly suitable for the separation and purification of diamines having about six or more carbon atoms or more, and especially from six to sixteen carbon atoms, from monoamines having similar volatilities. Examples of the specified diamines and monoamines which can be separated by means of the method of this invention are listed in conjunction with the dimerization reactions discussed above.

The method of this invention has a number of outstanding advantages. It provides a method of separating certain undesirable impurities from aliphatic, aromatic, and alicyclic diamines. The separation involves the use of commercially available liquid-liquid extraction and distillation equipment and general procedures. The extracting solvents used are commercially available and are essentially completely recoverable. Consequently, the invention permits the separation and purification of large quantities of amines at low cost.

Since monoamines are chain stoppers in polymerization of diamines with dibasic acids, it is frequently necessary to reduce the monoamine content of diamines feed material to very low concentrations. The present invention provides a method for the substantially complete separation of monoamines from mixtures with diamines.

The invention will be more fully understood by reference to the following examples although it is to be understood that the novel separation method of this invention can readily be employed with other amine mixtures and extracting solvents, and is not limited to a specific method of preparing the amines.

Example I

Benzene was reacted in methanol solution at 25° C. with hydroxylamine hydrochloride and titanous chloride and the resultant reaction product mixture subjected to hydrogenation over a 5% palladium on carbon catalyst. The hydrogenated mixture was then made strongly alkaline with aqueous caustic and extracted with isopropanol. Removal of the isopropanol, methanol, and water by distillation left a residue, which upon analysis was found to be a mixture of diaminobicyclohexyls, including 4,4'- and 2,4'-diaminobicyclohexyl, and aminobicyclohexyls, including 2- and 4 - aminobicyclohexyl. Attempted separation of the desired diamines from the monoamines by simple distillation was difficult due to the closeness in volatilities. The higher temperatures attendant upon the use of more efficient distillation columns caused decomposition of the amines with the formation of undesirable by-products.

Run A.—25.5 g. of a mixture of distilled diamine containing the diaminobicyclohexyls and aminobicyclohexyl was dissolved in 160 ml. acetonitrile. 320 ml. of water was added to this mixture followed by 480 ml. of hexane. The mixture was shaken in a separatory funnel and the layers separated. The upper hexane layer was evaporated to give 12.4 g. of a mixture having a Neutral Equivalent (N.E.) of 188.

The aqueous layer was distilled in vacuum to remove the acetonitrile, then extracted with benzene. On evaporation, the benzene extract left 10.7 g. of a liquid with a N.E. of 125.

Run B.—The 10.7 g. of liquid record from (N.E.= 125) was dissolved in 80 g. of acetonitrile and 160 ml. water. This was shaken with 240 ml. of hexane and the resultant layers separated. The upper layer was evaporated to give 1.5 g. of amine having a N.E. of 165. The aqueous acetonitrile layer was treated as in Run A, giving on evaporation 5.5 g. of diamine with a N.E. of 111.

Run C.—26.5 g. of a mixed amine portion (N.E.= 132) was dissolved in a mixture of 160 ml. methanol and 320 ml. water. It was then extracted with 500 ml. hexane. The layers were separated. The upper hexane layer on evaporation gave 12.7 g. of a liquid with a N.E. of 181. The aqueous layer was distilled to remove methanol, then extracted with benzene. The benzene layer on evaporation gave 11.4 g. of material with a N.E. of 111.

Run D.—745 g. of mixed amines (N.E.=123) was dissolved in a solution containing 500 ml. methanol and 400 ml. water. This solution was pumped into the 15th stage of a 22 stage 1″ diameter York-Scheibel counter current extraction column at a rate of 9 ml./min. while a mixture of 1 part methanol and 2 parts of water was fed to the top of the column at a rate of 42 ml. per min. and hexane introduced at the bottom of the column at a rate of 37 ml. per minute. Hexane was removed by distillation from the upper effluent to give 261 g. of residue with a N.E. of 181.

The aqueous phase was extracted several times with benzene, benzene-isopropanol, and benzene-ether to give approx. 450 g. of material with a N.E. of 102. This portion was distilled in vacuum to collect a major portion, B.P. 112–138° C./0.6–0.8 mm. weight 393 gms. (N.E.= 99.1). This portion was solid.

In the following table the results obtained in Runs A through D are outlined. The data reveal that the separation process of this invention can readily be employed to separate effectively monoamines from diamines.

TABLE A

| Runs | A | B | C | D |
|---|---|---|---|---|
| Polar Solvent | Acetonitrile H₂O | Acetonitrile H₂O | MeOH H₂O | MeOH H₂O |
| Non-Polar Solvent | Hexane | Hexane | Hexane | Hexane |
| Polar/Non-polar Solvent Ratio | 1:1 | 1:1 | 1:1 | 1:1 |
| No. of Extractions | 1 | 1 | 1 | Multiple |
| Yield of Extract, percent | 49 | 14 | 48 | 36 |
| Yield of Raffinate, percent | 42 | 57 | 43 | 62 |
| Amine Content of Mixture, percent | 4 | 2 | 2.5 | 5 |
| N.E. of Amine Mixture | 132 | 125 | 132 | 123 |
| N.E. of Extract Phase | 188 | 165 | 181 | 180.5 |
| N.E. of Raffinate Phase | 125 | 111 | 111 | 99.1 |

NOTE 1.—Calculated N.E. of monoamines=181.
NOTE 2.—Calculated N.E. of diamines=98.

Example II 2600 gms. of crude product consisting of a mixture of monoaminobicyclohexyls and diaminobicyclohexyls, was diluted with 1500 ml. of methanol and 1200 ml. of water. This total solution was pumped at a rate of 8–10 ml./minute into the 15-stage level of a 22-stage liquid-liquid extractor.

Octane was passed through the column at a rate of 30–35 ml./minute and a dilute methanol solution consisting of 1 volume methanol and 2 volumes water was added at the same rate of 30–35 ml./minute. The octane fractions were concentrated as they were collected and the octane distillate returned to the system.

Five and one-half gallons of the methanol-water extract were collected, then concentrated on the steam bath, under water aspirator vacuum, to 2 gallons. This concentrate was extracted in the following manner:

1000 ml. was placed in a separatory funnel, 500 ml. of a 1:1 mixture of benzene and isopropanol added and the mixture well shaken. The organic layer was separated and set aside; then the aqueous layer was extracted with 250 ml. of fresh benzene, after which the aqueous layer was discarded.

The fresh benzene was diluted with an equal volume of isopropanol, and this mixture in turn used to extract another 1000 ml. portion of the aqueous concentrate. This process was repeated until extraction of the 2 gallons of aqueous concentrate was complete.

The benzene-isopropanol extracts were combined and then concentrated, first on the steam bath under water-pump vacuum, then with an oil pump to 0.3 mm. There was left 1465 gms. of residue. This was distilled from an oil bath maintained at 160°–170° C. Only a small quantity of forerun, B.P. to 107° C./0.7 mm., was obtained. Then 1075 gms. of diaminobicyclohexyl product, distilling as a partially solid distillate, was obtained B.P. 107°–112° C./0.7, N.E. calcd., 98.16, N.E. found 98.8.

Concentration of the hexane extract yielded 930 gms. of residue, which on standing, largely solidified. Analysis showed this residue to be essentially free of diamines, and to consist almost entirely of monoaminobicyclohexyls, mainly 2- and 4-aminobicyclohexyls.

Example III

A mixture of saturated aliphatic 8-carbon diamines, and monoamines, i.e., 84% diaminooctane and 16% octylamines, obtained in accordance with the process of U.S. 3,156,729 is dissolved in 33% by volume of methanol in water and then shaken in octane. The solvents are separated and the liquid phases distilled to recover amine. The results in Table B indicate that the solvent system is effective in making a separation between diamines and monoamines.

Example IV

A mixture of 43% aniline and 57% phenylene diamine dissolved in a solution of hydrocarbons made up of 65% benzene and 35% hexane is shaken with an equal volume of 25% methanol in water. The solvents are separated and evaporated to give the results shown in Table B. As in Example III, an effective separation is made in a single stage.

TABLE B

| | Ex. III | Ex. IV |
|---|---|---|
| Conc. of amines in solvent, percent | 10 | 10 |
| N.E. of crude amines | 80 | 70 |
| Percent monoamine in mixture | 14 | 42 |
| Percent yield of amines in extract phase | 14 | 40 |
| N.E. of extract portion | 125 | 88 |
| Percent monoamine in extraction portion | 93 | 86 |
| Percent yield of amines in raffinate phase | 86 | 60 |
| N.E. of raffinate phase | 74 | 59 |
| Percent diamine in raffinate phase | 97 | 87 |
| Theory, N.E. of monoamine | 129 | 93 |
| Theory, N.E. of diamine | 72 | 54 |

The above data further demonstrate that the separation process of this invention is effective for treating mixtures of various amines to separate the monoamines from the diamines.

While particular embodiments of this invention are specifically shown above, it will be understood that the invention is obviously subject to variations and modification without departing from its broader aspects.

What is claimed is:

1. A liquid-liquid extraction process for the separation of monoamines from diamines which comprises contacting a mixture of aliphatic, alicyclic or aromatic monoamines and diamines, the major proportion of said amines having at least 6 carbon atoms per molecule, with a polar liquid which is a solvent for said diamines and a non-polar liquid which is a solvent for the monoamines, the volume ratio of polar to non-polar liquids being in the range of about 1:50 to 50:1, and recovering an extract phase comprising said non-polar liquid and said monoamines.

2. The process of claim 1 wherein said mixture of amines comprises a major proportion of $C_8$ aliphatic monoamines and diamines.

3. The process of claim 1 wherein said mixture of amines comprises a major proportion of $C_{12}$ alicyclic monoamines and diamines.

4. The process of claim 1 wherein said polar liquid is a lower alcohol.

5. The process of claim 4 wherein said polar liquid is an aqueous solution of said lower alcohol containing up to 80% by volume of water.

6. The process of claim 5 wherein said lower alkanol is methanol.

7. The process of claim 1 wherein said polar liquid is an aqueous solution of acetonitrile containing up to 80% by volume of water.

8. The process of claim 1 wherein said non-polar liquid is a hydrocarbon having from 4 to 18 carbon atoms per molecule.

9. The process of claim 8 wherein said non-polar liquid is hexane.

10. The process of claim 8 wherein said non-polar liquid is octane.

11. The process of claim 8 wherein said non-polar liquid is an admixture of benzene and hexane.

12. A liquid-liquid extraction process for the separation of monoamines from diamines which comprises contacting a mixture of aliphatic, alicyclic or aromatic monoamines and diamines, the major proportion of said amines having at least 6 carbon atoms per molecule, with a lower alkanol and a hydrocarbon having from 4 to 18 carbon atoms per molecule, the volume ratio of said lower alkanol to hydrocarbon being within the range of about 1:5 to 10:1, and recovering an extract phase comprising said hydrocarbon and said monoamines.

13. The process of claim 12 wherein said mixture of amines comprises diaminobicyclohexyls and monoaminobicyclohexyls.

14. The process of claim 12 wherein said lower alkanol is methanol.

15. The process of claim 12 wherein said lower alkanol is an aqueous solution of methanol.

16. The process of claim 12 wherein said hydrocarbon is hexane.

17. The process of claim 12 wherein said hydrocarbon is octane.

References Cited

UNITED STATES PATENTS

| 2,434,424 | 1/1948 | Morris et al. | 203—59 |
| 2,503,119 | 4/1950 | McKinnis | 260—705 |
| 3,156,729 | 11/1964 | Mador et al. | 260—563 |

CHARLES B. PARKER, *Primary Examiner.*

P. C. IVES, *Assistant Examiner.*

U.S. Cl. X.R.

260—578, 583, 705